US012602955B2

(12) United States Patent
Lee et al.

(10) Patent No.: US 12,602,955 B2
(45) Date of Patent: Apr. 14, 2026

(54) VEHICLE TERMINAL AND CALCULATION SERVER FOR CALCULATING SAFE DRIVING INDEX BASED ON LONGITUDINAL ACCELERATION

(71) Applicants: Hyundai Motor Company, Seoul (KR); Kia Corporation, Seoul (KR)

(72) Inventors: Myung Hyun Lee, Seoul (KR); Sung Hwan Moon, Bucheon-si (KR); Seo Won Beun, Yongin-si (KR); Seong Woo Hong, Hwaseong-si (KR); Yun Seok Seol, Seoul (KR); Seong Man Kang, Seoul (KR); Jae Sang Park, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 73 days.

(21) Appl. No.: 18/607,912

(22) Filed: Mar. 18, 2024

(65) Prior Publication Data

US 2025/0166427 A1 May 22, 2025

(30) Foreign Application Priority Data

Nov. 20, 2023 (KR) ........................ 10-2023-0160417

(51) Int. Cl.
*G07C 5/02* (2006.01)

(52) U.S. Cl.
CPC ...................................... *G07C 5/02* (2013.01)

(58) Field of Classification Search
CPC ... G07C 5/02; B60W 40/09; B60W 2510/205; B60W 2540/30; G06Q 50/40
See application file for complete search history.

(56) References Cited

U.S. PATENT DOCUMENTS

| | | | | |
|---|---|---|---|---|
| 8,717,170 | B1 * | 5/2014 | Juhasz | B60L 53/63 340/5.2 |
| 8,965,669 | B2 * | 2/2015 | Fisher | G06Q 10/047 701/123 |
| 9,491,420 | B2 * | 11/2016 | Mimar | G08B 21/0476 |
| 10,189,359 | B2 * | 1/2019 | Lowenthal | B60L 53/63 |
| 11,227,452 | B2 * | 1/2022 | Rosenbaum | G07C 5/008 |
| 11,413,982 | B2 * | 8/2022 | Goei | B60L 53/53 |
| 2012/0233077 | A1 * | 9/2012 | Tate, Jr. | G06Q 10/20 705/65 |
| 2020/0064850 | A1 * | 2/2020 | Hong | G05D 1/0088 |
| 2022/0297699 | A1 * | 9/2022 | Kim | H04W 4/06 |
| 2022/0306127 | A1 * | 9/2022 | Zhou | B60W 60/001 |

FOREIGN PATENT DOCUMENTS

KR 20170090974 A 8/2017

* cited by examiner

*Primary Examiner* — Gertrude Arthur Jeanglaude
(74) *Attorney, Agent, or Firm* — Slater Matsil, LLP

(57) ABSTRACT

A vehicle terminal can includes one or more processors, and a storage medium storing computer-readable instructions. The computer-readable instructions, when executed by the one or more processors, can be configured to enable the one or more processors to collect driving information of a vehicle, calculate a separate safe driving index for each indicator including rapid acceleration, rapid deceleration, late-night driving, a sudden lane change, or any combination thereof, based on the driving information of the vehicle collected, and transmit the calculated separate safe driving indexes for the indicators, at preset intervals, to a server.

20 Claims, 10 Drawing Sheets

| INDICATOR | NUMBER OF TIMES IN 90 DAY | NUMBER OF TIMES PER UNIT DISTANCE |
|---|---|---|
| LATE-NIGHT DRIVING | 1 | 0.001 |
| RAPID ACCELERATION | 4 | 0.004 |
| SUDDEN-LANE CHANGE | 2 | 0.002 |
| RAPID DECELERATION | 3 | 0.003 |

FIG. 4A

| DIVISION | | ESTIMATION COEFFICIENT |
|---|---|---|
| SECTION | | 12.8133 |
| LATE-NIGHT DRIVING | A = 0.002 OR MORE | a = −0.0524 |
| | B = LESS THAN 0.002 | b = 0.0000 |
| RAPID ACCELERATION | C = 0.008 OR LESS | c = −0.2615 |
| | D = 0.008 ~ 0.035 | d = −0.1323 |
| | E = GREATER THAN 0.035 | e = −0.0717 |
| SUDDEN-LANE CHANGE | F = 0.0012 OR LESS | f = −0.1482 |
| | G = 0.0012 ~ 0.005 | g = −0.0784 |
| | H = GREATER THAN 0.005 | h = 0.0000 |
| RAPID DECELERATION | I = 0.006 OR LESS | i = −0.3980 |
| | J = 0.006 ~ 0.004 | j = −0.2293 |
| | K = GREATER THAN 0.004 | k = −0.0917 |

FIG. 4B

VEHICLE TERMINAL AND CALCULATION SERVER FOR CALCULATING SAFE DRIVING INDEX BASED ON LONGITUDINAL ACCELERATION

CROSS-REFERENCE TO RELATED APPLICATIONS

This application claims the benefit of Korean Patent Application No. 10-2023-0160417, filed on Nov. 20, 2023, which application is hereby incorporated herein by reference in its entirety.

TECHNICAL FIELD

The present disclosure relates to a vehicle terminal and calculation server for calculating a safe driving index.

BACKGROUND

Usage-Based Insurance (UBI) is a service using driver's driving information to discount insurance premiums. In detail, a safe driving index may be calculated based on indicators such as the number of rapid accelerations, rapid decelerations, sudden starts, and an amount of late-night driving during a given period (for example, 90 days), and then the insurance premium may be discounted based thereon.

Among the above-mentioned indicators, rapid acceleration, rapid deceleration, and sudden starts are all based on vehicle speed, and thus, there may be a problem in that they do not reflect different weights or driving characteristics for respective vehicle types.

SUMMARY

The present disclosure relates to a vehicle terminal and calculation server for calculating a safe driving index based on longitudinal acceleration.

Some embodiments of the present disclosure can provide a vehicle terminal and calculation server for calculating a safe driving index based on longitudinal acceleration, in which different weights or driving characteristics for each vehicle type may be reflected.

According to an embodiment of the present disclosure, a vehicle terminal for calculating a safe driving index based on longitudinal acceleration includes one or more processors and a storage medium storing computer-readable instructions. The computer-readable instructions, when executed by the one or more processors, can be configured to enable the one or more processors to collect driving information of a vehicle, to calculate a safe driving index for each indicator including at least one of rapid acceleration, rapid deceleration, late-night driving, and a sudden lane change, based on the driving information of the vehicle collected, and to transmit the safe driving index for each indicator calculated, at preset intervals. The safe driving index can be calculated based on the safe driving index for each indicator. A safe driving index of the rapid acceleration and a safe driving index of the rapid deceleration can be calculated based on the longitudinal acceleration of the vehicle.

According to an embodiment of the present disclosure, a calculation server for calculating a safe driving index based on longitudinal acceleration includes one or more processors and a storage medium storing computer-readable instructions. The computer-readable instructions, when executed by the one or more processors, can be configured to enable the one or more processors to receive a safe driving index for each indicator, including at least one of rapid acceleration, rapid deceleration, late-night driving, and a sudden lane change, at a preset period, the safe driving index for each indicator can be calculated based on driving information of a vehicle, and to calculate the safe driving index based on the safe driving index for each indicator received, at a preset period. The safe driving index of the rapid acceleration and the safe driving index of the rapid deceleration can be calculated based on the longitudinal acceleration of the vehicle.

BRIEF DESCRIPTION OF THE DRAWINGS

The above and other features and advantages of the present disclosure can be more clearly understood from the following detailed description, taken in conjunction with the accompanying drawings, in which:

FIGS. 4A and 4B are diagrams illustrating the number of times for each indicator during a predetermined period, the number of times per unit distance, and the constant of a generalized linear model according to an embodiment;

DETAILED DESCRIPTION OF ILLUSTRATIVE EMBODIMENTS

Hereinafter, specific example embodiments will be described with reference to the drawings. The detailed description below can provide a comprehensive understanding of the methods, devices, and/or systems described herein. However, embodiments of the present disclosure shown herein are only examples and the present disclosure is not necessarily limited thereto.

In describing some embodiments, if it is determined that a detailed description of the known technology related to the present disclosure may unnecessarily obscure the subject matter of the present disclosure, such detailed description can be omitted. In addition, terms described herein can be terms in consideration of functions in the present disclosure, which may vary according to other embodiments, such as according to variations and customizations by a user or operator. Terminology used in the detailed description can be only for describing some embodiments and should not be taken as necessarily limiting. Unless expressly used otherwise, singular forms of expression can include plural forms. In this description, expressions such as "including" and "comprising" are intended to indicate any characteristic, number, step, operation, elements, portion, or combination thereof, and such terms should not be construed to exclude the existence or possibility of one or more other characteristics, numbers, steps, operations, elements, parts, or combinations thereof.

Figure 1:
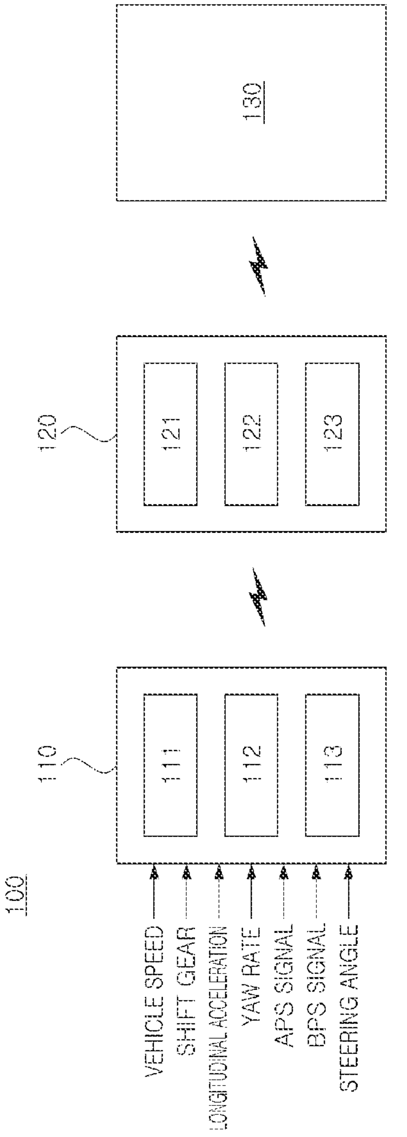
FIG. 1 is a diagram illustrating an entire system including a vehicle terminal and a calculation server for calculating a safe driving index based on longitudinal acceleration according to an embodiment of the present disclosure.

FIG. 1 is a diagram illustrating an entire system 100 including a vehicle terminal 110 and a calculation server 120 for calculating a safe driving index based on longitudinal acceleration according to some embodiments of the present disclosure. The entire system may include the vehicle terminal 110, the calculation server 120, and an insurance company server 130, for example.

Hereinafter, with reference to FIG. 1, the entire system 100 including the vehicle terminal 110 and the calculation server 120 for calculating a safe driving index based on longitudinal acceleration according to some embodiments will be described.

The vehicle terminal 110 may collect driving information of the vehicle and calculate a safe driving index for each indicator based on the collected driving information of the vehicle. This vehicle terminal 110 may include a control unit 111, a communication unit 112, and a storage unit 113.

The control unit 111 may collect driving information of the vehicle, and calculate a safe driving index for each indicator, including rapid acceleration, rapid deceleration, late-night driving, sudden lane changes, or any combination thereof, based on the collected driving information of the vehicle. The vehicle's driving information may include vehicle speed, shift gear, longitudinal acceleration, yaw rate, Accelerator Position Sensor (APS) signal, Brake Position Sensor (BPS) signal, steering angle, or any combination thereof, for example. Accordingly using some embodiments of the present disclosure, by replacing the sudden start used in the related art with sudden lane changes when calculating the safe driving index, the problem of rapid acceleration and sudden start being counted twice when making a sudden start from a stop state may be resolved.

The control unit 111 may control the communication unit 112, which will be described later, to transmit the calculated safe driving index for each indicator to the calculation server 120 at preset intervals.

According to an embodiment of the present disclosure, the control unit 111 may calculate a plurality of safe driving indices for each indicator based on vehicle driving information collected at a shorter period than a preset period, and may transmit a safe driving index with a maximum value for each indicator among the plurality of calculated safe driving indices for respective indicators to the calculation server 120. The preset period can be 1 second, and the shorter period than the preset period may be 500 ms or less, in detail, 200 ms, for example.

Figure 2:
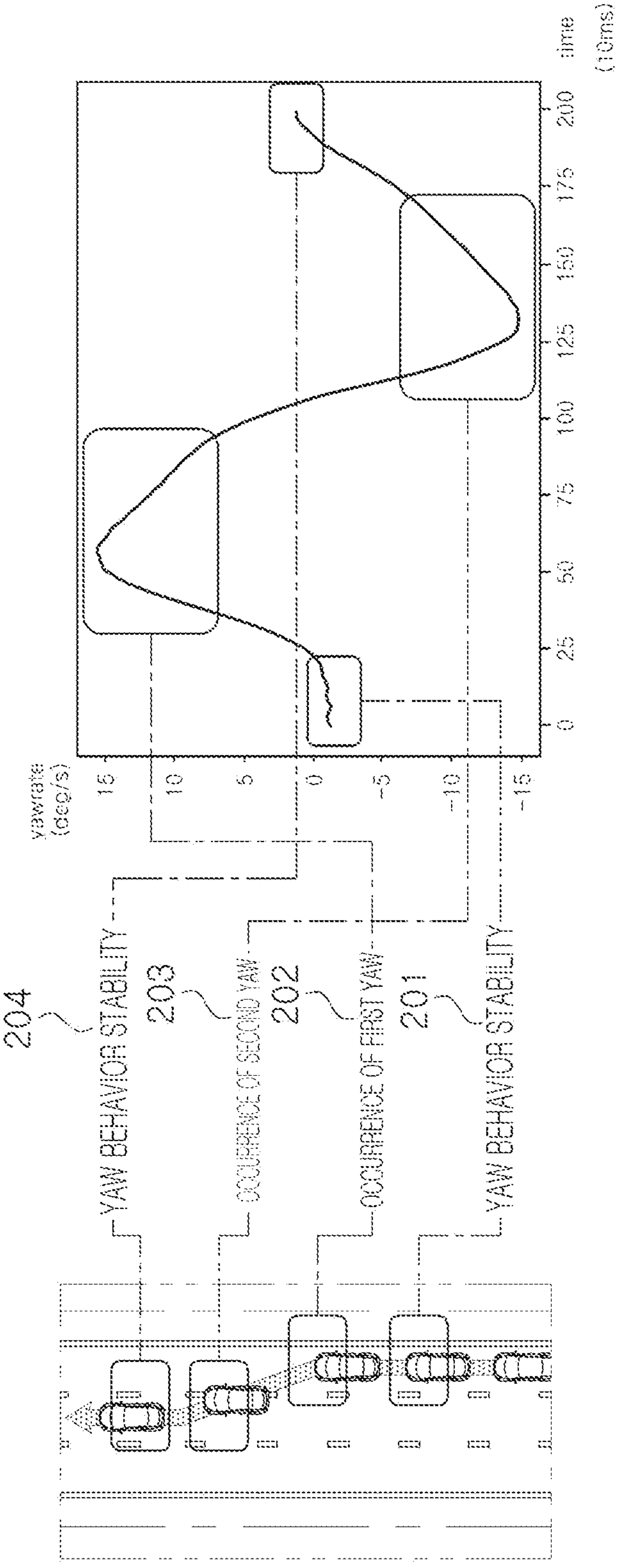
FIG. 2 is a diagram illustrating yaw behaviors among driving information of a vehicle when changing lanes suddenly.
Figure 3A:
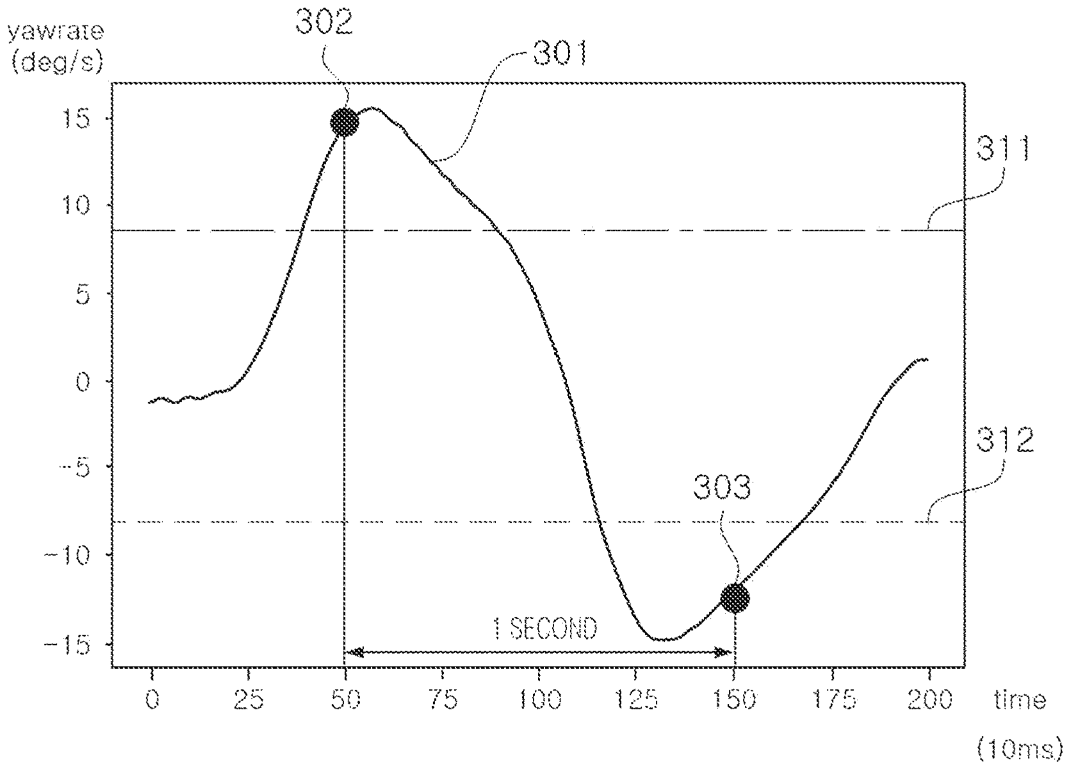
FIGS. 3A and 3B are diagrams illustrating a problem in the case of collecting yaw rate at 1-second intervals during yaw behaviors.
Figure 3B:
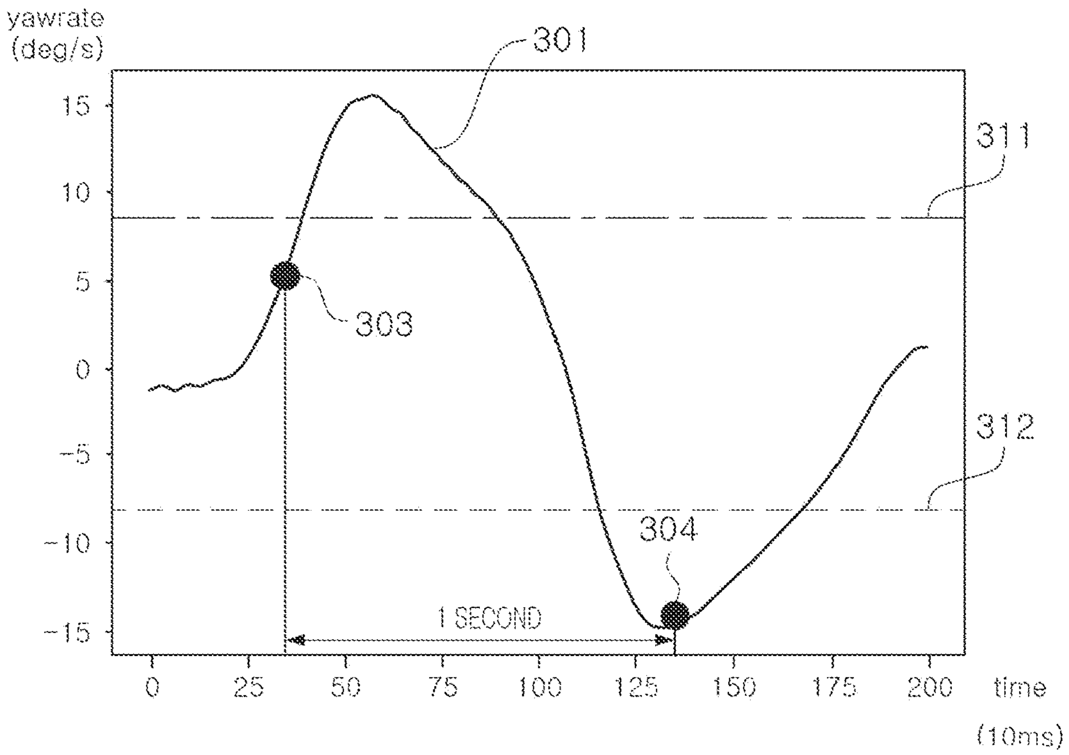

FIG. 2 is a diagram illustrating example yaw behaviors of vehicle driving information when changing lanes suddenly. FIGS. 3A and 3B are diagrams illustrating a problem when collecting the yaw rate in a 1-second cycle during yaw behavior.

As illustrated in FIG. 2, the yaw behavior of the vehicle can change when rapidly changing lanes. In detail, the yaw behavior of the driving vehicle can be in a stable state (201), and then when the lane changes suddenly, a first yaw behavior and a second yaw behavior can occur (202 and 203). Then, when the sudden lane changes are completed, the yaw behavior of the vehicle can change to a stable state (204).

In this example case, if the yaw rate collection period is 1 second, the yaw rate that exceeds threshold values 311 and 312 may not be detected. For example, in the case of FIG. 3A, two points 302 and 303 where the yaw rate 301 exceeds the threshold values 311 and 312 may be accurately detected. In the case of FIG. 3B, a point 304 that exceeds a minimum threshold 312 may be detected, but because a remaining point 303 is within the maximum threshold 311, points outside the maximum threshold 311 cannot be detected. On the other hand, according to an embodiment of the present disclosure, the collection period of the vehicle's driving information can be smaller (for example, 200 ms) than 1 second, thereby detecting vehicle driving information to quickly and accurately calculate a safe driving index.

Figure 3C:
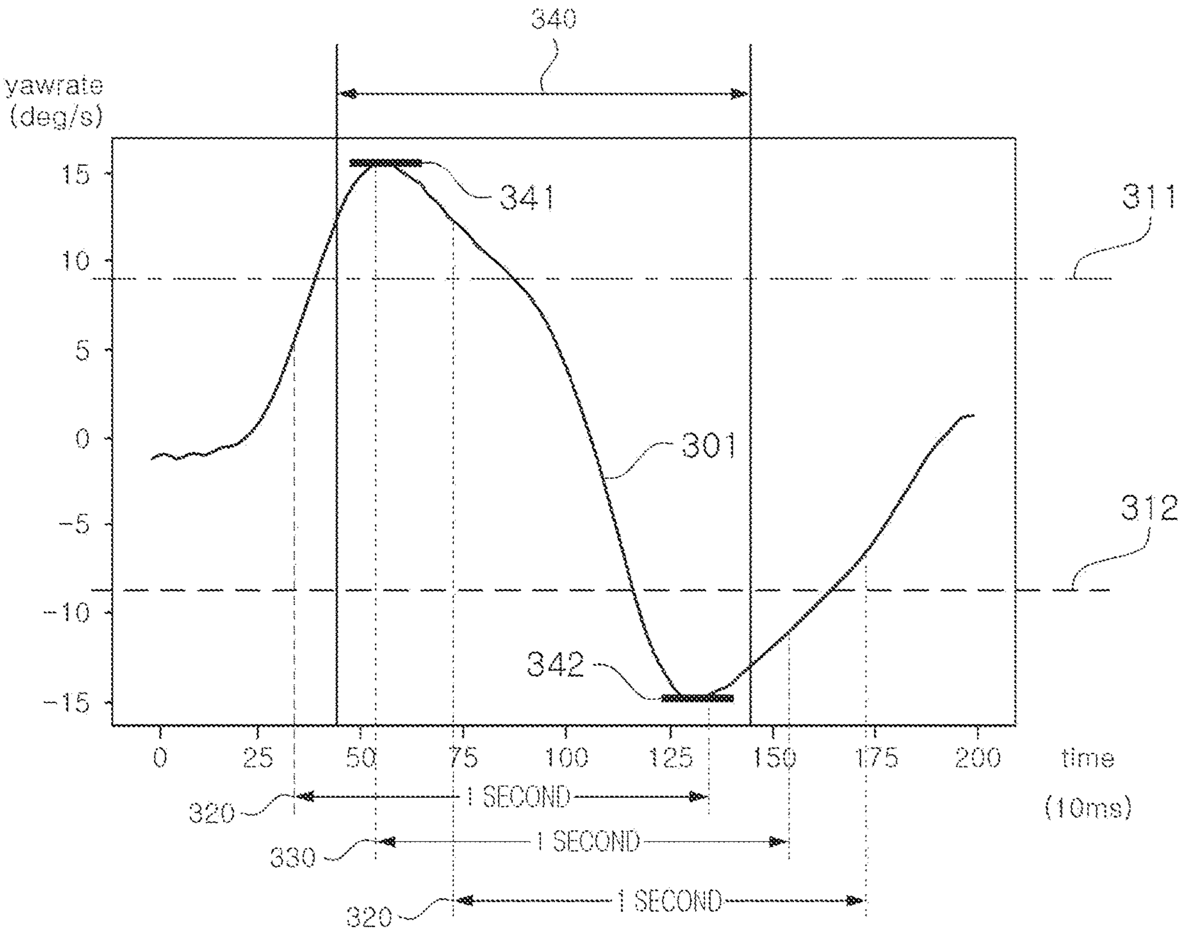
FIG. 3C is a diagram illustrating a sudden lane change.

FIG. 3C is a diagram illustrating sudden lane changes as an example. As illustrated in FIG. 3C, if the vehicle's speed is a minimum speed (for example, 40 kph) and in the case in which the absolute value of the yaw rate 301 has a maximum value 341 and a minimum value 342 that exceed the threshold values 311 and 312 within a selected, preset, or predetermined period 340 (for example, 1 second), it may be a sudden lane change. On the other hand, reference numeral 320 indicates a case in which a sudden lane change is not recognized when the yaw rate is collected at 1-second intervals, and reference numeral 330 is a case in which sudden lane changes may be recognized when yaw rate is collected at 1-second intervals.

Additionally, according to an embodiment of the present disclosure, when the above-mentioned indicators are rapid acceleration and rapid deceleration, the safe driving index may be calculated based on the longitudinal acceleration. Accordingly, different weights and driving characteristics may be reflected for each vehicle type.

Below, processes of calculating the safe driving index for each indicator of rapid acceleration, rapid deceleration, late-night driving, and sudden lane changes is described. To facilitate understanding of the present disclosure, specific numbers are limited, but it should be noted that specific values may be modified as needed depending on the vehicle type, weight, or the like, for example.

When the indicator is rapid acceleration, the control unit 111 may calculate the safe driving index based on the shift gear, average vehicle speed, accelerator pedal amount based on the APS signal, and longitudinal acceleration.

In detail, when the shift gear is the driving gear (D gear), and based on the longitudinal acceleration at the time when the average vehicle speed and the accelerator pedal amount respectively satisfy a preset reference value or more, the control unit 111 may calculate the safe driving index for rapid acceleration according to a subsequent change in longitudinal acceleration. In this case, the driving stage (D stage) and the average vehicle speed can be used to check whether the vehicle is in a driving state, and the accelerator pedal amount can reflect the offset of the longitudinal acceleration and can be used to prevent misdetection due to ramps.

Additionally, the safe driving index for rapid acceleration may include a level index corresponding to the amount of change in longitudinal acceleration. The above-mentioned level index may be plural, for example from Lv1 to Lv10. For example, when the change in longitudinal acceleration is 0.1 g to 0.2 g, the level index may be Lv1, and when the change in longitudinal acceleration is 0.2 g to 0.3 g, the level index may be Lv2, and in this manner or in a manner similar thereto, the level index may be determined or calculated.

A preset reference value for the average vehicle speed may be a value between 3 kph and 8 kph, and in detail, may be 5 kph, for example. In addition, a preset reference value for the accelerator pedal amount may be a value between 40% and 60%, in detail, 50%, for example.

On the other hand, in the case in which the indicator is rapid deceleration, the control unit 111 may calculate the safe driving index based on the shift gear, average vehicle speed, brake operation based on the BPS signal, and longitudinal acceleration.

In detail, when the shift gear is the driving stage (D stage) and the average vehicle speed satisfies the preset reference value or more, and based on the longitudinal acceleration at the time when the brakes are activated, the control unit 111 may calculate the safe driving index for rapid deceleration according to the subsequent change in longitudinal acceleration. The safe driving index for rapid deceleration may be set differently depending on the presence of electronic stability control (ESC) and/or the steering angle. The driving stage (D stage) and the average vehicle speed can be used to check whether the vehicle is in a driving state.

Additionally, the safe driving index for rapid deceleration may include a level index corresponding to the amount of change in longitudinal acceleration. The above-mentioned level index may be plural, for example from Lv1 to Lv10. For example, when the change in longitudinal acceleration is less than 0.2 g when the electronic stability control is not in operation, the level index is Lv1, and when the change in longitudinal acceleration is 0.2 g to 0.3 g or more, the level index is Lv2, and as described above, the level index may be calculated in the same manner or in a manner similar thereto. Additionally, when electronic stability control is in operation and the steering angle is a certain angle (for example, 50 degrees) or more, and when the change in longitudinal acceleration is less than 0.3 g, the level index may be calculated as Lv1, and when the change in longitudinal acceleration is 0.3 g to 0.4 g or more, the level index may be calculated as Lv2, or the like.

The preset reference value for the average vehicle speed may be a value between 3 kph and 8 kph, in detail, 5 kph, for example.

On the other hand, when the indicator is sudden lane changes, the control unit 111 may calculate the safe driving index based on the average vehicle speed, steering angular speed, and yaw rate.

The control unit 111 may calculate the safe driving index for sudden lane changes depending on a subsequent steering angular speed, based on the point in time when the average vehicle speed, steering angular speed, and the absolute value of yaw rate can be respectively the preset reference value or more.

The safe driving index for sudden lane changes may include a level index corresponding to the steering angular speed. The above-mentioned level index may be plural, for example from Lv1 to Lv10. For example, when the steering angular speed is less than 200 deg/sec, the level index may be calculated as Lv1, and when the steering angular speed is 200 deg/sec to 300 deg/sec, the level index may be calculated as Lv2, or the like, for example.

The preset reference value for the average vehicle speed may be a value between 20 kph and 40 kph, in detail, 30 kph, for example. The preset reference value for the steering angular speed may be a value between 150 deg/sec and 250 deg/sec, in detail, 200 deg/sec, for example. The preset reference value for the absolute value of the yaw rate may be a value between 8 deg/sec and 12 deg/sec, in detail, 10 deg/sec, for example.

The safe driving index for late-night driving may be the number of late-night drives within a preset time (for example, 11 p.m. to 5 a.m.), and in this case, driving within a preset distance (for example, less than 5 km) may be excluded from the number of late-night drives, for example.

As driving within a preset distance can be excluded from the number of late-night drives, customer claims that occur when driving short distances late at night may be reduced.

On the other hand, the communication unit 112 may transmit the safe driving index for each indicator described above to the calculation server 120.

The storage unit 113 may store various programs and data to implement the functions performed by the control unit 111 described above.

On the other hand, the calculation server 120 may calculate a safe driving index based on the safe driving index for each indicator received from the vehicle terminal 110. This calculation server 120 may include a control unit 121, a communication unit 122, and a storage unit 123.

The control unit 121 may control the communication unit 122 to receive the safe driving index for each indicator at preset intervals.

Thereafter, the control unit 121 may calculate a safe driving index based on the received safe driving index for each indicator.

In detail, for each indicator, the control unit 121 may accumulate the number of times the safe driving index exceeds a preset standard indicator for a selected, set, or predetermined period of time (for example, 90 days), and may convert the accumulated number of safe driving indices into the number of times per unit distance, and may then calculate the safe driving index based on the converted number of times per unit distance.

According to an embodiment, the control unit 121 may calculate a safe driving index by applying the converted number of times per unit distance to a generalized linear model (GLM). The generalized linear model described above can be an extended model of the linear model, including cases in which the dependent variable is not normally distributed, and a generalized linear model can be a widely known technology, and thus a detailed description thereof will be omitted.

FIGS. 4A and 4B are diagrams illustrating the number of safe driving indices for each indicator for a selected, set, or predetermined period of time, the number of times per unit distance, and the constant of the generalized linear model according to an embodiment. FIG. 4A illustrates the number of safe driving indices for each indicator over a selected, set, or predetermined period (for example, 90 days) and the number per converted unit distance (for example, 1 km). FIG. 4B illustrates constants of the generalized linear model. On the other hand, Equation 1 below illustrates a generalized linear model.

$$\text{Log}(Y) = a \times A + b \times B + c \times C + d \times D + e \times E + f \times F + g \times G + h \times H + i \times I + j \times J + k \times K \quad \text{[Equation 1]}$$

In detail, the safe driving index (Y) may be obtained by multiplying the number of times (A to K) per unit distance converted for each indicator by the corresponding estimation coefficients (a to k), for example. The above-mentioned estimation coefficients (a to k) may be constants obtained in advance.

In some embodiments of the present disclosure, a generalized linear model is described as an example, but machine learning models, such as Gradient Boosting Machine (GBM) or the like, may also be applied.

Afterwards, the control unit 121 may control the communication unit 122 to transmit the safe driving index to the insurance company server 130.

On the other hand, the communication unit 122 may transmit the safe driving index to the insurance company server 130 under the control of the control unit 121 and receive the safe driving index for each indicator from the vehicle terminal 110.

The storage unit 123 may store various programs and data to implement the functions performed by the control unit 121 described above.

As a result, the insurance company server 130 may receive the safe driving index and calculate an insurance discount rate based on the received safe driving index.

As described above, according to an embodiment, based on the vehicle's driving information, a safe driving index can be calculated for each indicator including rapid acceleration, rapid deceleration, late-night driving, sudden lane changes, or any combination thereof, and as the safe driving index for rapid acceleration and the safe driving index for rapid deceleration can be calculated based on the vehicle's longitudinal acceleration, different weights and driving characteristics for respective vehicle types may be reflected.

Figure 5:
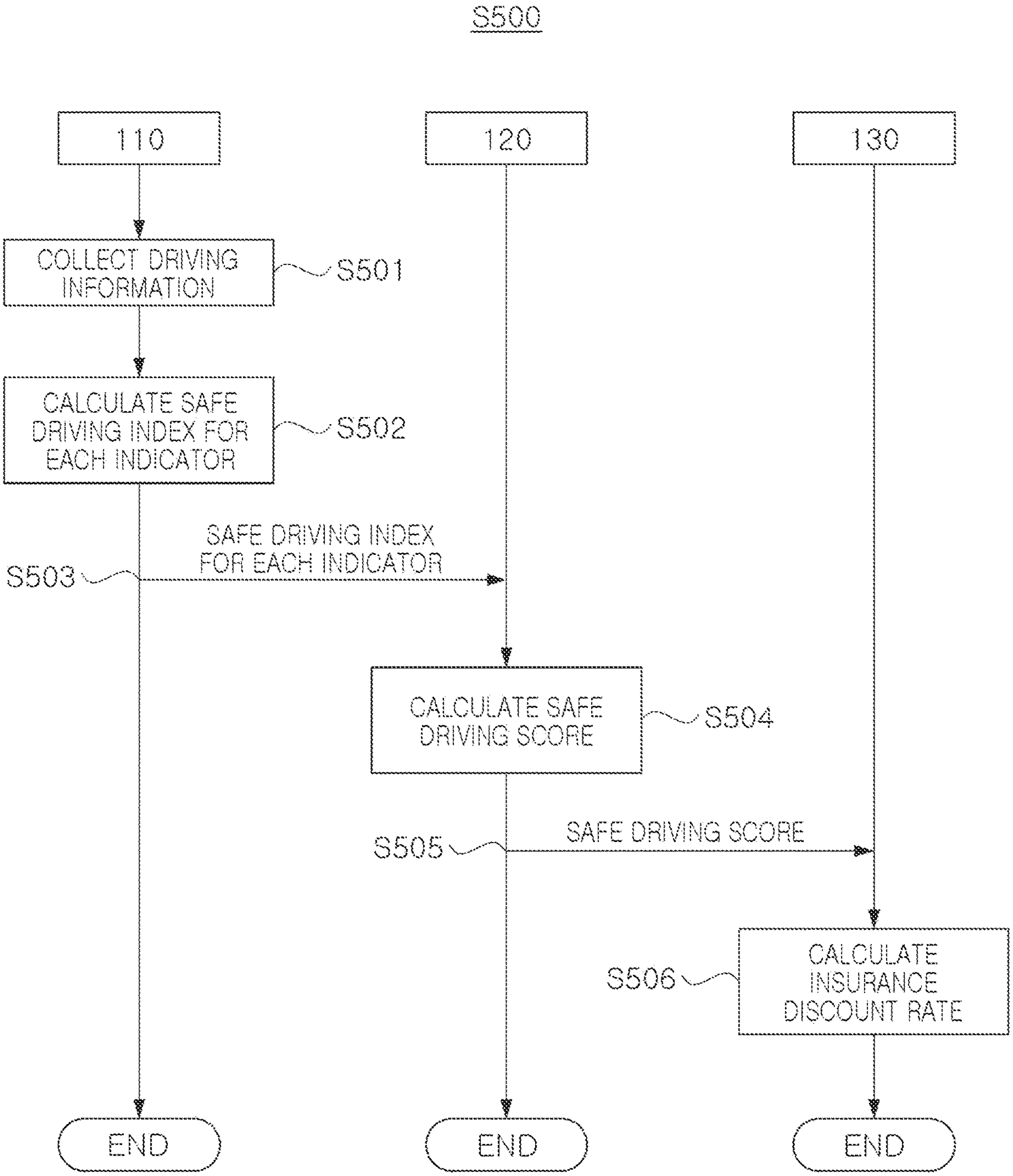
FIG. 5 is a flowchart illustrating a method of calculating a safe driving index based on longitudinal acceleration according to an embodiment of the present disclosure.
Figure 6:
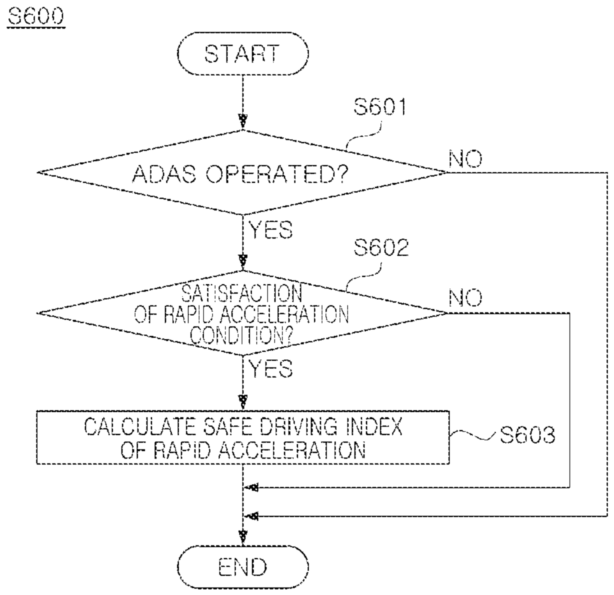
FIG. 6 is a flowchart illustrating a process of determining rapid acceleration among indicators and calculating a safe driving index for rapid acceleration, according to an embodiment of the present disclosure.
Figure 7:
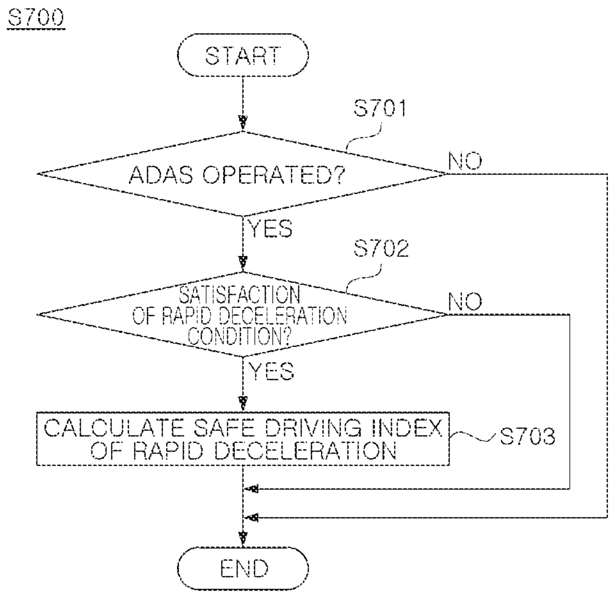
FIG. 7 is a flowchart illustrating a process of determining rapid deceleration and calculating a safe driving index for rapid deceleration, among indicators, according to an embodiment of the present disclosure.
Figure 8:
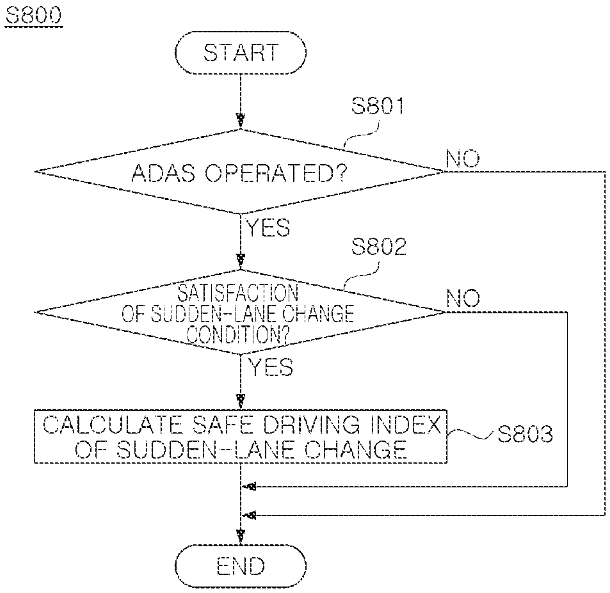
FIG. 8 is a flowchart illustrating a process of determining a sudden lane change and calculating a safe driving index for the sudden lane change, among indicators, according to an embodiment of the present disclosure.

On the other hand, FIG. 5 is a flowchart illustrating a method of calculating a safe driving index based on longitudinal acceleration according to an embodiment. FIG. 6 is a flowchart illustrating a process of determining rapid acceleration and calculating a safe driving index for the rapid acceleration among the indicators according to an embodiment. FIG. 7 is a flowchart illustrating a process of determining rapid deceleration and calculating a safe driving index of rapid deceleration among the indicators according to an embodiment. FIG. 8 is a flowchart illustrating a process of determining a sudden lane change and calculating a safe driving index for sudden lane change among the indicators according to an embodiment.

Hereinafter, a method S500 of calculating a safe driving index based on longitudinal acceleration according to an embodiment will be described with reference to FIGS. 1 to 8. However, for simplification of descriptions of the present disclosure, descriptions overlapping with FIGS. 1 to 4 are omitted.

Referring to FIGS. 1 to 8, a method S500 of calculating a safe driving index based on longitudinal acceleration according to an embodiment may begin with an operation of collecting driving information of the vehicle from the vehicle terminal 110 (operation S501).

Thereafter, the vehicle terminal 110 may calculate a safe driving index for each indicator including rapid acceleration, rapid deceleration, late-night driving, sudden lane changes, or any combination thereof, based on the collected driving information of the vehicle (operation S502). As described above, the driving information of the vehicle may include vehicle speed, shift gear, longitudinal acceleration, yaw rate, Accelerator Position Sensor (APS) signal, Brake Position Sensor (BPS) signal, steering angle, or any combination thereof, for example.

Next, the vehicle terminal 110 may transmit the calculated safe driving index for each indicator to the calculation server 120 at preset intervals (operation S503).

According to an embodiment, the vehicle terminal 110 may calculate a plurality of safe driving indices for each indicator based on the vehicle's driving information collected at a shorter period than a preset period, and may transmit a safe driving index having a maximum value for each indicator among the calculated safe driving indices for each indicator to the calculation server 120. The preset period can be 1 second, and as described above, a period shorter than the preset period may be 500 ms or less, in detail, 200 ms, for example.

Referring to FIGS. 6 to 8, processes of calculating the safe driving index for each indicator of rapid acceleration, rapid deceleration, late-night driving, and sudden lane changes will be described.

FIG. 6 is a flowchart illustrating a process S600 of determining rapid acceleration and calculating a safe driving index of rapid acceleration accordingly, among indicators according to an embodiment of the present disclosure.

Referring to FIG. 6, the vehicle terminal 110 may determine whether an advanced driver assistance system (ADAS) is operating (operation S601). As a result of the determination, when the advanced driver assistance system is operating, it may be further determined whether the rapid acceleration condition is satisfied (operation S602).

For example, the vehicle terminal 110 may determine that the rapid acceleration condition is satisfied when the shift gear is the driving gear (e.g., D gear) and the average vehicle speed and the accelerator pedal amount are respectively equal to or greater than a preset reference value. The preset reference value for the average vehicle speed can be a value between 3 kph and 8 kph, in detail, 5 kph, and the preset reference value for the accelerator pedal amount may be a value between 40% and 60%, in detail, 50%, for example, as described above.

Afterwards, for example, when the shift gear is the driving gear (D gear), and based on the longitudinal acceleration at the time when the average vehicle speed and the accelerator pedal amount respectively satisfy the preset reference value, the vehicle terminal 110 may calculate the safe driving index of rapid acceleration according to a subsequent change in longitudinal acceleration (operation S603).

FIG. 7 is a flowchart illustrating a process S700 of determining rapid deceleration and calculating the safe driving index for rapid deceleration among indicators according to an embodiment of the present disclosure.

Referring to FIG. 7, the vehicle terminal 110 may determine whether an advanced driver assistance system (ADAS) is operating (operation S701). As a result of the determination, when the advanced driver assistance system is operating, it may be further determined whether the rapid deceleration condition is satisfied (operation S702).

For example, the vehicle terminal 110 may determine that the rapid deceleration condition is satisfied when the shift gear is the drive gear (D gear), the average vehicle speed satisfies a preset reference value or more, and the brakes are activated. As described above, the preset reference value for the average vehicle speed can be a value between 3 kph and 8 kph, in detail, 5 kph, for example.

Afterwards, for example, when the shift gear is the driving gear (D gear) and the average vehicle speed satisfies a preset reference value or more, and based on the longitudinal acceleration speed at the time the brakes are activated, the vehicle terminal 110 may calculate the safe driving index for rapid deceleration according to a subsequent change in longitudinal acceleration (operation S703). As described above, the safe driving index for rapid deceleration may be set differently depending on the presence of electronic stability control (ESC) and/or the steering angle.

FIG. 8 is a flowchart illustrating a process S800 of determining a sudden lane change and calculating a safe driving index for the sudden lane change among the indicators according to an embodiment of the present disclosure.

Referring to FIG. 8, the vehicle terminal 110 may determine whether an advanced driver assistance system (ADAS) is operating (operation S801). As a result of the determination, when the advanced driver assistance system is operating, it may be further determined whether the sudden lane change condition is satisfied (operation S802).

In detail, the vehicle terminal 110 may determine that the sudden lane change condition is satisfied when the average vehicle speed, the steering angular speed (or steering angular velocity), and the absolute value of yaw rate are respectively greater than or equal to a preset reference value. The preset reference value for the average vehicle speed may be a value between 20 kph and 40 kph, in detail, 30 kph, for example. The preset reference value for the steering angular speed may be a value between 150 deg/sec and 250 deg/sec, in detail, 200 deg/sec, for example. As described above, the preset reference value for the absolute value of the yaw rate may be a value between 8 deg/sec and 12 deg/sec, in detail, 10 deg/sec, for example.

Thereafter, the vehicle terminal 110 may calculate the safe driving index of a sudden lane change according to a subsequent steering angular speed, based on the point in time when the average vehicle speed, the steering angular speed, and the absolute value of yaw rate are respectively a preset reference value or more (operation S803).

Referring to FIG. 5, the vehicle terminal 110 may transmit the calculated safe driving index for each indicator to the calculation server 120 at preset intervals (operation S503).

Thereafter, the calculation server 120 may calculate the safe driving index based on the safe driving index for each indicator received at preset intervals (operation S504).

In detail, the calculation server 120 may accumulate, for each indicator, the number of the safe driving indices that are a preset standard indicator or more for a selected, set, or predetermined period of time, and may convert the accumulated number of safe driving indices into the number per unit distance, and may then calculate a safe driving index based on the converted number of times per unit distance. As described above, the calculation server 120 may calculate the safe driving index by applying the converted number of times per unit distance to a generalized linear model (GLM), for example.

Thereafter, the calculation server 120 may transmit the calculated safe driving index to an insurance company server 130 (operation S505).

As a result, the insurance company server 130 may receive the safe driving index and calculate the insurance discount rate based on the received safe driving index (operation S506).

As described above, according to some embodiments of the present disclosure, based on the vehicle's driving information, a safe driving index can be calculated for each indicator including rapid acceleration, rapid deceleration, late-night driving, sudden lane changes, or any combination thereof, and the safe driving index for rapid acceleration and the safe driving index for rapid deceleration can be calculated based on the vehicle's longitudinal acceleration, thereby reflecting different weights and driving characteristics for each vehicle type.

Figure 9:
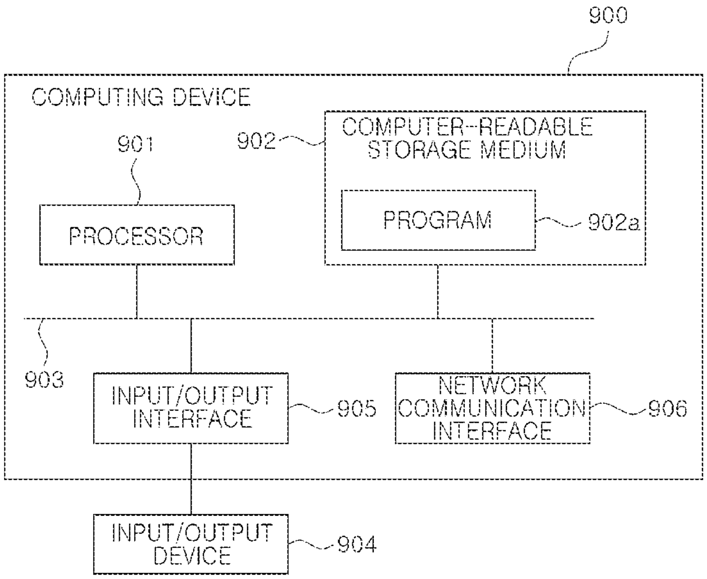
FIG. 9 is a block diagram of a computing device that may fully or partially implement a vehicle terminal and a calculation server for calculating a safe driving index based on longitudinal acceleration according to an embodiment of the present disclosure.

FIG. 9 is a block diagram of a computing device 900 that may fully or partially implement the vehicle terminal 110 and/or the calculation server 120 for calculating safe driving index based on longitudinal acceleration according to some embodiments of the present disclosure.

As illustrated in FIG. 9, the computing device 900 can include at least one processor 901, a computer-readable storage medium 902, and a communication bus 903, any combination of or all of which may be in plural or may include plural components thereof.

The processor 901 may enable the computing device 900 to operate according to some embodiments of the present disclosure. For example, the processor 901 may execute code including one or more programs stored in the computer-readable storage medium 902. The one or more programs may include one or more computer executable instructions, and the computer-executable instructions, when executed by the processor 901, may be configured to cause the computing device 900 to perform operations according to some embodiments of the present disclosure.

The computer-readable storage medium 902 can be configured to store computer-executable instructions or program code, program data, and/or other suitable form of information. A program 902*a* stored in the computer-readable storage medium 902 can include a set of instructions executable by the processor 901. In an embodiment, the computer-readable storage medium 902 may be a memory (a volatile memory, such as random access memory, a non-volatile memory, or an appropriate combination thereof), one or more magnetic disk storage devices, optical disk storage devices, flash memory devices, or other form of storage medium that may be accessed by computing device 900 and store required information, or suitable combinations thereof.

The communication bus 903 can interconnect various other components of the computing device 900, including the processor 901 and the computer-readable storage medium 902, any combination of or all of which may be in plural or may include plural components thereof.

The computing device 900 may also include one or more input/output interfaces 905 and one or more network communication interfaces 906 that provide an interface for one or more input/output devices 904. The input/output interface 905 and the network communication interface 906 can be connected to the communication bus 903. The network may be any one of cellular networks, such as Global System for Mobile Communications (GSM), Enhanced Data Rates for GSM Evolution (EDGE), General Packet Radio Service (GPRS), Code Division Multiple Access (CDMA), Time Division-CDMA (TD-CDMA), Universal Mobile Telecommunications System (UMTS), Long Term Evolution (LTE), or other cellular networks, for example.

The input/output device 904 may be connected to other components of the computing device 900 through the input/output interface 905. Examples of the input/output device 904 may include input devices, such as pointing devices (such as a mouse, trackpad or the like), keyboards, touch input devices (such as a touchpad or touch screen), voice or sound input devices, various types of sensor devices and/or imaging devices, and/or output devices, such as display devices, printers, speakers, and/or network cards. The illustrative input/output device 904 may be included within the computing device 900, as a component constituting the computing device 900, and may also be connected to the computing device 900, as a separate device that is distinct from the computing device 900.

In some embodiments of the present disclosure, a program for performing the methods described in this specification on a computer, and a computer-readable recording medium containing the program, may be included. The computer-readable recording medium may include program instructions, local data files, local data structures, and the like, singly or in combination. The medium may be those specifically designed and constructed for a given embodiment of the present disclosure, or may be those commonly available in the computer software field. Examples of the computer-readable recording media may include magnetic media such as hard disks, floppy disks, and magnetic tapes, optical recording media such as CD-ROMs and DVDs, and a specially configured hardware device to store and perform program instructions, such as ROM, RAM, flash memory, and the like. Examples of the above programs may include not only machine language code such as that produced by a compiler, but also high-level language code that may be executed by a computer using an interpreter, or the like.

As set forth above, according to some embodiments of the present disclosure, a safe driving index can be calculated for each indicator including at least one of rapid acceleration, rapid deceleration, late-night driving, and sudden lane changes, based on vehicle's driving information. Because the safe driving index for rapid acceleration and the safe driving index for rapid deceleration can be calculated based on the vehicle's longitudinal acceleration, different weights and driving characteristics may be reflected for each vehicle type.

According to some embodiments of the present disclosure, a vehicle terminal instead of an existing server can calculate a safe driving index for each indicator including at least one of rapid acceleration, rapid deceleration, late-night driving, and sudden lane changes, based on vehicle's driving information. Therefore, the load on external servers may be reduced and driving information may be processed rapidly.

According to some embodiments of the present disclosure, as driving data for driving by the driver's will and driving data for driving by the driving assistance/autonomous driving function are discriminated, the driver's willful driving may only be reflected in the safe driving index, thereby responding to customer claims when applying autonomous driving technology.

While example embodiments have been illustrated and described above, it can be apparent to those skilled in the art that modifications and variations can be made without departing from the scope of the present disclosure as defined by the appended claims.

What is claimed is:

1. A vehicle terminal comprising:

one or more processors; and a storage medium storing computer-readable instructions that, when executed by the one or more processors, enable the one or more processors to:

collect driving information of a vehicle, calculate a separate safe driving index for each indicator of a set of insurance-related indicators including one of or any combination of rapid acceleration, rapid deceleration, late-night driving, and a sudden lane change based on the collected driving information, and transmit, to a server, the calculated separate safe driving index for each indicator at preset intervals, wherein a total safe driving index is calculated based on the calculated separate safe driving index for each indicator, and wherein a first separate safe driving index of the rapid acceleration and a second separate safe driving index of the rapid deceleration are calculated based on a longitudinal acceleration of the vehicle.

2. The terminal of claim 1, wherein the instructions enable the one or more processors, in response to the indicator being the rapid acceleration and a gear shift being a driving gear, to calculate the first separate safe driving index of the rapid acceleration, including a first level index corresponding to an amount of change in the longitudinal acceleration according to a subsequent change amount in the longitudinal acceleration, and based on the longitudinal acceleration at a time point when an average vehicle speed and an accelerator pedal amount are a first set of preset reference values or more, respectively.

3. The terminal of claim 2, wherein a first subset reference value for the average vehicle speed is between 3 kph and 8 kph, and wherein a second subset reference value for the accelerator pedal amount is between 40% and 60%.

4. The terminal of claim 1, wherein the instructions enable the one or more processors to, in response to the indicator being the rapid deceleration and in response to a gear selection being a driving gear and an average vehicle speed being a preset reference speed value or more, calculate the second separate safe driving index of the rapid deceleration including a second level index corresponding to a first amount of change of the longitudinal acceleration according to a second amount of change in a subsequent longitudinal acceleration, and based on the longitudinal acceleration at a time point when brakes are activated.

5. The terminal of claim 4, wherein the preset reference speed value for the average vehicle speed is between 3 kph and 8 kph.

6. The terminal of claim 4, wherein the second separate safe driving index of the rapid deceleration is set differently depending on one of or both of a presence of electronic stability control (ESC) and a steering angle.

7. The terminal of claim 1, wherein the instructions enable the one or more processors to, in response to the indicator being the late-night driving:

set a late-night driving number within a preset time as a fourth separate safe driving index for the late-night driving, and exclude from the late-night driving number any driving trips that are less than a preset distance.

8. A vehicle terminal comprising:

one or more processors; and a storage medium storing computer-readable instructions that, when executed by the one or more processors, enable the one or more processors to:

collect driving information of a vehicle, calculate a separate safe driving index for each indicator of a set of insurance-related indicators including one of or any combination of rapid acceleration, rapid deceleration, late-night driving, and a sudden lane change based on the collected driving information, and transmit, to a server, the calculated separate safe driving index for each indicator at preset intervals, wherein a total safe driving index is calculated based on the calculated separate safe driving index for each indicator, wherein a first separate safe driving index of the rapid acceleration and a second separate safe driving index of the rapid deceleration are calculated based on a longitudinal acceleration of the vehicle, and wherein the instructions enable the one or more processors to, in response to the indicator being the sudden lane change, calculate a third separate safe driving index of the sudden lane change based on an average vehicle speed, a steering angular speed, and a yaw rate.

9. The terminal of claim 8, wherein the instructions enable the one or more processors to calculate the third separate safe driving index of the sudden lane change including a third level index corresponding to the steering angular speed based on a time point when the average vehicle speed, the steering angular speed, and an absolute value of the yaw rate are a second set of preset reference values or more, respectively.

10. The terminal of claim 9, wherein a third subset preset reference value for the average vehicle speed is between 20 kph and 40 kph, wherein a fourth subset preset reference value for the steering angular speed is between 150 deg/sec and 250 deg/sec, and wherein a fifth subset preset reference value for the absolute value of the yaw rate is between 8 deg/sec and 12 deg/sec.

11. A server comprising:

one or more processors; and a storage medium storing computer-readable instructions that, when executed by the one or more processors, enable the one or more processors to:

receive, from a vehicle terminal, a separate safe driving index for each indicator of a set of insurance-related indicators including one of or any combination of rapid acceleration, rapid deceleration, late-night driving, and a sudden lane change, at a first preset period, wherein the separate safe driving index for each indicator is calculated based on driving information of a vehicle, and calculate a total safe driving index based on the received separate safe driving indexes for the set of insurance-related indicators, at a second preset period, and wherein a first separate safe driving index of the rapid acceleration and a second separate safe driving index of the rapid deceleration are calculated based on a longitudinal acceleration of the vehicle.

12. The server of claim 11, wherein the first separate safe driving index for the rapid acceleration is calculated according to an amount of change in subsequent longitudinal acceleration, when a gear selection is a driving gear and based on the longitudinal acceleration at a first time when an average vehicle speed and an accelerator pedal amount are a first set of preset reference values or more, respectively.

13. The server of claim 12, wherein a first subset preset reference value for the average vehicle speed is between 3 kph and 8 kph, and wherein a second subset preset reference value for the accelerator pedal amount is between 40% and 60%.

14. The server of claim 11, wherein the second separate safe driving index of the rapid deceleration is calculated according to an amount of change in subsequent longitudinal acceleration, when a shift range is a drive range and an average vehicle speed is a preset reference speed value or more, and based on the longitudinal acceleration at a time point when brakes are activated.

15. The server of claim 14, wherein the preset reference speed value for the average vehicle speed is between 3 kph and 8 kph.

16. The server of claim 14, wherein the second separate safe driving index of the rapid deceleration is set differently depending on one of or both of a presence of electronic stability control (ESC) and a steering angle.

17. The server of claim 11, wherein a third separate safe driving index of the sudden lane change is calculated based on an average vehicle speed, a steering angular speed, and a yaw rate.

18. The server of claim 17, wherein the third separate safe driving index of the sudden lane change is calculated according to the steering angular speed, based on a time point when the average vehicle speed, the steering angular speed, and an absolute value of the yaw rate are a second set of preset reference values or more, respectively.

19. The server of claim 18, wherein a third subset preset reference value for the average vehicle speed is between 20 kph and 40 kph, wherein a fourth subset preset reference value for the steering angular speed is between 150 deg/sec and 250 deg/sec, and a fifth subset preset reference value for the absolute value of the yaw rate is between 8 deg/sec and 12 deg/sec.

20. The server of claim 11, wherein a fourth separate safe driving index for the late-night driving is a late-night driving number of late-night drives within a preset time, excluding from the late-night driving number any driving trips that are less than a preset distance.

* * * * *